US008137590B2

(12) United States Patent
Briehn et al.

(10) Patent No.: US 8,137,590 B2
(45) Date of Patent: Mar. 20, 2012

(54) PARTICLES COMPRISING ZWITTERIONIC STRUCTURAL ELEMENTS

(75) Inventors: Christoph Briehn, Munich (DE); Peter Ball, Emmerting (DE); Martina Baumann, Sauerlach (DE); Torsten Gottschalk-Gaudig, Mehring (DE); Manfred Hoelzl, Munich (DE)

(73) Assignee: Wacker Chemie AG, Munich (DE)

( * ) Notice: Subject to any disclaimer, the term of this patent is extended or adjusted under 35 U.S.C. 154(b) by 568 days.

(21) Appl. No.: 12/091,082

(22) PCT Filed: Oct. 5, 2006

(86) PCT No.: PCT/EP2006/067105
§ 371 (c)(1),
(2), (4) Date: Apr. 22, 2008

(87) PCT Pub. No.: WO2007/048691
PCT Pub. Date: May 3, 2007

(65) Prior Publication Data
US 2008/0286628 A1 Nov. 20, 2008

(30) Foreign Application Priority Data
Oct. 27, 2005 (DE) .................... 10 2005 051 587

(51) Int. Cl.
*H01B 1/00* (2006.01)
(52) U.S. Cl. ........ 252/500; 424/490; 427/128; 427/130; 429/518
(58) Field of Classification Search .................. 252/500; 424/46, 490; 428/331, 407; 429/33, 518; 523/203; 528/26, 27, 34; 204/601; 430/108.11, 430/108.15; 536/25.4; 427/128, 130
See application file for complete search history.

(56) References Cited

U.S. PATENT DOCUMENTS

| | | | | |
|---|---|---|---|---|
| 4,151,154 | A * | 4/1979 | Berger ........................ | 523/203 |
| 4,493,926 | A | 1/1985 | Williams, Jr. et al. | |
| 4,496,705 | A * | 1/1985 | Florence et al. ................ | 528/34 |
| 4,496,795 | A | 1/1985 | Konnik | |
| 4,523,002 | A * | 6/1985 | Campbell et al. ............... | 528/26 |
| 4,525,567 | A * | 6/1985 | Campbell et al. ............... | 528/27 |
| 4,918,210 | A | 4/1990 | Fenton et al. | |
| 5,919,583 | A | 7/1999 | Grot et al. | |
| 5,939,471 | A | 8/1999 | Watanabe et al. | |
| 7,083,888 | B2 * | 8/2006 | Kudo et al. .............. | 430/108.15 |
| 7,238,426 | B2 * | 7/2007 | Jiang et al. ..................... | 428/407 |
| 7,632,389 | B2 * | 12/2009 | Wen et al. ..................... | 204/601 |
| 2002/0055051 | A1 * | 5/2002 | Kudo et al. .............. | 430/108.11 |
| 2004/0053060 | A1 | 3/2004 | Roziere et al. | |
| 2005/0004661 | A1 * | 1/2005 | Lewis et al. ................... | 623/1.42 |
| 2005/0053818 | A1 | 3/2005 | St-Arnaud et al. | |
| 2006/0083694 | A1 * | 4/2006 | Kodas et al. ..................... | 424/46 |
| 2006/0264620 | A1 * | 11/2006 | Lee et al. ..................... | 536/25.4 |
| 2008/0286628 | A1 * | 11/2008 | Briehn et al. ................... | 429/33 |
| 2009/0202816 | A1 * | 8/2009 | Schlenoff ...................... | 428/331 |

FOREIGN PATENT DOCUMENTS

| | | |
|---|---|---|
| DE | 3417912 C1 | 7/1985 |
| DE | 3422268 C1 | 6/2008 |
| JP | 2001155744 A | 6/2001 |
| WO | 9634036 A1 | 10/1996 |
| WO | 0045447 | 8/2000 |

OTHER PUBLICATIONS

Litt et al., "Siloxane Zwitterions: Synthesis and Surface Properties of Crosslinked Polymers," J. Appl. Poly. Sci. 1975, v.19, pp. 1221-1225.
Graiver et al., "Polysiloxane Zwitterionomers and Related Model Compounds. I. Synthesis," J. Polymer Sci. 1979, v.17, pp. 3559-3572.
Snow et al, "Synthesis and Characterization of Zwitterionic Silicone Sulfobetaine Surfactants," Langmuir 1990, v.6, pp. 385-391.
Table of Contents for: Atlas of Zeolite Framework Types, 5th ed., Ch. Baerlocher, W.M. Meier, D. H. Olson, Amsterdam: Elsevier 2001, 3 pgs.
Ullmann's Enzyklopadie der Technischen Chemie, 4th ed., vol. 21, p. 464: online Release 2008 on Pyrogenic Silica.
Saint-Michel, Fabrice et al., "Fractal Behavior and Scaling Law of Hydrophobic Silica in Polyol," J. Colloid Interface Sci. 2003, 267, pp. 314-319.
Voronkov, M.G. et al., "New Organosilicon Derivatives of Nitrogen-Containing Heterocycles," Chem. Heterocycl. Compd. 2001, v. 37, n. 11, pp. 1358-1368.
Dzuy, N.Q. et al., "Direct Yield Stress Measurement with the Vane Method," J. Rheol. 1985, 29(3), pp. 335-347.
Hass, Karl-Heinz et al., "Functionalized Coating Materials Based on Inorganic-Organic Polymers", Thin Solid Films 351 (1999), pp. 198-203.
Barnes, G.H. et al., "Synthesis and Hydrolytic Stability of Some Organosilicon Phosphonate Esters," J. Org. Chem. 1960, v. 25, pp. 1191-1194.
English Abstract corresponding to DE 3417912.
English Abstract corresponding to DE 3422268.
English Abstract corresponding to JP 2001155744.

* cited by examiner

*Primary Examiner* — Khanh Tuan Nguyen
(74) *Attorney, Agent, or Firm* — Brooks Kushman P.C.

(57) ABSTRACT

Solid particles bearing zwitterionic functional groups exhibit properties unlike other functionalized particles, and are particularly useful as proton-conductive fillers in membranes for fuel cells, where they increase physical properties as well as charge conducting properties. The particles are prepared by reacting functionalized particles with zwitterionic group-containing silanes or siloxanes.

22 Claims, No Drawings

US 8,137,590 B2

PARTICLES COMPRISING ZWITTERIONIC STRUCTURAL ELEMENTS

CROSS-REFERENCE TO RELATED APPLICATION

This application is the U.S. national phase of PCT Appln. No. PCT/EP2006/067105 filed Oct. 5, 2006 which claims priority to German application DE 10 2005 051 587.8 filed Oct. 27, 2005.

BACKGROUND OF THE INVENTION

1. Field of the Invention

The invention relates to particles having zwitterionic structural elements on the surface, and also their production and use, in particular in composite materials.

2. Description of the Related Art

Finely divided particles which, when added to a matrix alter its properties, are referred to as fillers. Fillers are nowadays used for many purposes in the chemical industry. They can alter the mechanical properties of plastics, e.g. hardness, tear strength, resistance to chemicals, electrical, thermal and ionic conductivities, adhesion or coefficient of thermal expansion. Surface modification of the fillers generally allows the compatibility of the filler with the matrix to be influenced and the property profile of the composite to be significantly improved as a result. Preference is given to using modified fillers which are reactive toward the polymer matrix. Thus, for example, carbinol-functional particles can be covalently bound to an isocyanate-functional resin. Such chemical incorporation of a filler into the polymer matrix is frequently associated with a considerable improvement in properties, for example mechanical reinforcement. A comparable mechanical reinforcement of a polymer is observed when a polar or ionic filler is incorporated into an appropriate polar or ionic matrix. In this case, the mechanical reinforcement is achieved by means of purely physical interactions (ionic interactions, dipole-dipole interactions) between filler and matrix.

Finely divided particles which when added to a matrix alter its properties are referred to as fillers. Fillers are nowadays used for many purposes in the chemical industry. They can alter the mechanical properties of plastics, e.g. hardness, tear strength, resistance to chemicals, electrical, thermal and ionic conductivities, adhesion or coefficient of thermal expansion. Surface modification of the fillers generally allows the compatibility of the filler with the matrix to be influenced and the property profile of the composite to be significantly improved as a result. Preference is given to using modified fillers which are reactive toward the polymer matrix. Thus, for example, carbinol-functional particles can be covalently bound to an isocyanate-functional resin. Such chemical incorporation of a filler into the polymer matrix is frequently associated with a considerable improvement in properties, for example mechanical reinforcement. A comparable mechanical reinforcement of a polymer is observed when a polar or ionic filler is incorporated into an appropriate polar or ionic matrix. In this case, the mechanical reinforcement is achieved by means of purely physical interactions (ionic interactions, dipole-dipole interactions) between filler and matrix.

Customary proton-conducting polymer electrolyte membranes (PEMs) as are used, for example, for producing fuel cells are made up of polymers which have covalently bound proton-conducting groups, in particular sulfonic acid groups or amino groups.

A problem which frequently occurs when the polymer electrolyte membranes are used in fuel cells is the low mechanical stability of the membranes. However, a high mechanical stability of the membranes against, inter alia, the pressure of the gases used as fuel is absolutely necessary for industrial use of the fuel cells. Particularly when polymer electrolyte membranes are used in fuel cells for automobile applications, membrane materials which can withstand very high mechanical stresses are necessary.

A particularly advantageous way of solving this problem is to use fillers which are capable of mechanically reinforcing the polymer matrix. If the fillers additionally have proton-conducting functions on their surface or the fillers used are materials having intrinsic conductivity, an improved proton conductivity of the composite membrane can be expected in addition to an improvement in the mechanical stability. Furthermore, the undesirable permeability for the fuel can be suppressed when suitable fillers are used.

Such composite membranes comprising proton-conducting polymers and inorganic particles are known from the literature. Thus, the documents US 2004/0053060, U.S. Pat. No. 5,919,583, WO 0045447, US 2005/0053818 and JP 2001/155744 describe mixtures comprising a proton-conducting organic polymer and unmodified or modified inorganic fillers. Fillers used are, inter alia, unmodified silica sols, aminoalkyl-functional silica sols and silica sols having sulfonic acid functions, and organic polymers used are sulfonated perfluorinated hydrocarbons and sulfonated polyether ketones.

The property profile of the membrane can in actual fact be improved appreciably by incorporation of such particles. However, optimal results are not achieved in all systems described in the prior art. In particular, the corresponding composite membranes still have an unsatisfactory proton conductivity and a mechanical stability which is insufficient for industrial use, as indicated, inter alia, by an insufficient modulus of elasticity and an unsatisfactory tensile strength.

A possible way of improving these properties is to use fillers which bear zwitterionic structural elements in which cationic and anionic groups are covalently bound to one another. Such fillers and their use for producing composite materials are not described in the literature.

On the other hand, silanes and siloxanes having zwitterionic structural elements, which can be obtained, for example, by reacting an aminosilane or an amino-functional siloxane with a halogenated carboxylic acid or an alkyl sultone, are known from the literature. In *J. APPL. POLYM. SCI.* 1975, 19, 1221-1225, Litt et al. teach the preparation of two zwitterionic alkoxysilanes by reaction of aminopropyltriethoxysilane or N-aminoethylaminopropyltrimethoxysilane with 1,3-propane sultone.

The documents DE 3 417 912 and DE 3 422 268 describe zwitterionic organofunctional siloxanes which can be obtained by quaternization of aminoalkyl-substituted polydimethylsiloxanes by means of ω-haloalkyl-carboxylates.

Zwitterionic polysiloxanes obtained by reaction of ethylenediamino-functional polysiloxanes with 1,3-propane sultone are described by Graiver et al., in *J. POLYMER SCI.* 1979, 17, 3559-3572.

In U.S. Pat. No. 4,918,210 and in *LANGMUIR* 1990, 6,385-391, Snow et al. teach the preparation of polysiloxanes containing quaternary ammonioalkylsulfonate groups and their use as a class of surface-active substances by means of which the surface tension of aqueous solutions can be considerably reduced. The silicone sulfobetaines reduce the surface tension at significantly lower reagent concentrations than the corresponding functionalized organic agents. U.S.

Pat. No. 4,496,795 describes such zwitterionic siloxanes, which are occasionally referred to as silicone sulfobetaines in the literature, as thermoplastic elastomers which due to their good adhesion to wood, metal, polycarbonate and polystyrene are suitable as, inter alia, sealants and adhesives and for coatings. The thermoplastic properties and in particular the excellent mechanical properties of the zwitterionic siloxanes are attributed to ionic crosslinking of adjacent zwitterionic siloxane chains.

SUMMARY OF THE INVENTION

The invention provides particles (PS) which have at least one structural element selected from among the general formulae [1] to [3],

  [1],

  [2],

  [3], and the protonated and deprotonated forms of the structural elements of the general formulae [1] to [3], where
A is a sulfonate radical —$SO_3$, a carboxylate radical —C(O)O or a phosphonate radical —P(O)($OR^7$)O,
B is $(CR^1{}_2)_m$, a substituted or unsubstituted alkyl radical interrupted by heteroatom(s), or a substituted or unsubstituted aryl or heteroaryl radical,
R and $R^7$ are each hydrogen or a substituted or unsubstituted hydrocarbon radical and
$R^1$ is hydrogen, a halogen or a substituted or unsubstituted hydrocarbon radical and
m can be 1, 2, 3, 4 or 5,
with the proviso that the nitrogen atom in the general formula [2] is an endocyclic nitrogen atom of an aliphatic heterocycle and with the proviso that the nitrogen atom in the general formula [3] is an endocyclic nitrogen atom of an aromatic heterocycle.

DETAILED DESCRIPTION OF THE PREFERRED EMBODIMENTS

The invention is based on the discovery that the particles of the invention (PS) are suitable for producing composite materials, in particular for producing membranes which have a significantly better mechanical stability and proton conductivity than the corresponding systems known from the literature. The particles (PS) have zwitterionic structural elements on the surface.

The structural elements of the general formulae [1] to [3] can be present in cationic form, i.e. with a positive total charge, for example due to protonation of A⁻, or in zwitterionic form, i.e. in uncharged form, depending on the pH of the surrounding medium. If the radical R in the structural elements of the general formulae [1] and [2] is hydrogen, the structural elements can also be present as anionic species, i.e. with a negative total charge, as a result of reaction with a base. In the following text, the silanes and siloxanes (S) functionalized by the structural elements of the general formulae [1] to [3] and the correspondingly modified particles (PS) will be referred to as zwitterionic silanes and siloxanes or particles regardless of their total charge.

The radical B is preferably ethyl, propyl, butyl, phenyl or a corresponding partially fluorinated or perfluorinated radical.

The radicals R, $R^1$ and $R^7$ are preferably hydrogen, halogens, in particular fluorine or chlorine, aliphatic or aromatic hydrocarbons having from 1 to 10, in particular from 1 to 6, carbon atoms. Particular preference is given to the radicals methyl, ethyl, n-propyl, i-propyl and phenyl and also perfluorinated methyl, ethyl, n-propyl and phenyl groups.

m is preferably 2, 3 or 4. The aliphatic heterocycles which are part of the structural element of the general formula [2] are preferably a substituted or unsubstituted aziridine, pyrrolidine, piperazine or piperidine. The aromatic heterocycles which are part of the structural element of the general formula [3] are preferably a substituted or unsubstituted pyridine, pyrrole, imidazole, benzimidazole, indole, quinoline, benzoxazole, benzothiazole, pyrazole or triazole.

The particles of the invention (PS) preferably have a specific surface area of from 0.1 to 1000 $m^2$/g, more preferably from 10 to 500 $m^2$/g (measured by the BET method in accordance with DIN EN ISO 9277/DIN 66132). The average size of the primary particles is preferably less than 10 μm, more preferably less than 1000 nm, with the primary particles also being able to be present as aggregates (definition in accordance with DIN 53206) and agglomerates (definition in accordance with DIN 53206) which can, depending on the external shear stress (e.g. as a function of the measurement conditions), have sizes in the range from 1 to 1000 μm.

In the particle (PS), the structural elements of the general formulae [1] to [3] can be bound covalently, via ionic interactions or van der Waals interactions. The structural elements of the general formulae [1] to [3] are preferably covalently bound.

The invention further provides a process for producing the particles (PS), in which particles (P) are reacted with silanes or siloxanes (S) which have at least one structural element of the general formulae [1] to [3].

In a particularly preferred process for producing the particles (PS), particles (P) having functions selected from among metal-OH, metal-O-metal, Si—OH, Si—O—Si, Si O-metal, Si—X, metal-X, metal-$OR^2$, Si—$OR^2$ are reacted with silanes, siloxanes (S) or their hydrolysis, alcoholysis and condensation products which have at least one structural element of the general formulae [1] to [3] and at least one reactive silyl group

which are reactive toward the surface functions of the particle (P),
where
$R^2$ is a substituted or unsubstituted alkyl radical,
X is a halogen atom and
Y is a halogen, a hydroxy or alkoxy group, a carboxylate or an enolate, with the proviso that the nitrogen atom in the general formula [2] is an endocyclic nitrogen atom of an aliphatic heterocycle via which the covalent bonding to the silane or siloxane (S) occurs and with the proviso that the nitrogen atom in the general formula [3] is an endocyclic nitrogen atom of an aromatic heterocycle via which the covalent bonding to the silane or siloxane (S) occurs.
$R^2$ is preferably an alkyl radical having from 1 to 10, more preferably from 1 to 6 carbon atoms. Particular preference is given to the radicals methyl, ethyl, n-propyl, and i-propyl.
X is preferably fluorine or chlorine.
Preference is given to the radicals Y each being a halogen or a hydroxy or alkoxy group. The radicals Y are more preferably chlorine atoms or hydroxy, ethoxy or methoxy radicals.

The invention further provides a process for producing the particles (PS), in which bonding of the structural elements of the general formulae [1] to [3] occurs during the particle synthesis. Here, the structural elements of the general formulae [1] to [3] can be part of a synthetic building block which participates in the production of the particles.

As an alternative, the production of the particles (PS) can be carried out in a two-stage process. In a first stage, particles (P) are reacted with an organo-functional reagent to form organofunctional particles (P'). The organic functions of the particle (P') can subsequently be converted into the structural elements of the general formulae [1] to [3] in a second stage by reaction with a further reagent. For example, the particle (P) is converted by reaction with an amino-functional silane into an amino-functional particle (P') which is converted in a subsequent reaction with 1,3-propane sultone into the particle (PS) containing the structural element of the general formula [1].

Suitable particles (P) are, for reasons of industrial handleability, oxides having a covalent component in the metal-oxygen bond, for example oxides of the 3rd main group, e.g. boron, aluminum, gallium or indium oxides, of the 4th main group, e.g. silicon dioxide, germanium dioxide, tin oxide, tin dioxide, lead oxide, lead dioxide, or oxides of the 4th transition group, e.g. titanium oxide, zirconium oxide and hafnium oxide. Further examples are nickel, cobalt, iron, manganese, chromium and vanadium oxides.

In addition, metals having an oxidized surface, zeolites (a listing of suitable zeolites may be found in: Atlas of Zeolite Framework Types, 5th edition, Ch. Baerlocher, W. M. Meier D. H. Olson, Amsterdam: Elsevier 2001), silicates, aluminates, aluminophosphates, titanates and aluminum layer silicates (e.g. bentonites, montmorillonites, smectites, hectorites) are suitable, with the particles (P) preferably having a specific surface area of from 0.1 to 1000 m$^2$/g, more preferably from 10 to 500 m$^2$/g (measured by the BET method in accordance with DIN 66131 and 66132). The particles (P), which preferably have an average diameter of less than 10 µm, more preferably less than 1000 nm, can be present as aggregates (definition in accordance with DIN 53206) and agglomerates (definition in accordance with DIN 53206) which can, depending on the external shear stress (e.g. as a function of the measurement conditions), have sizes in the range from 1 to 1000 µm.

As particles (P), particular preference is given to pyrogenic silica which is produced in a flame reaction from organosilicon compounds, e.g. from silicon tetrachloride or methyldichlorosilane, hydrogentrichlorosilane, hydrogenmethyldichlorosilane or other methylchlorosilanes or alkylchlorosilanes, also in admixture with hydrocarbons, or any volatile or sprayable mixtures of organosilicon compounds of the type mentioned and hydrocarbons, e.g. in a hydrogen-oxygen flame or else in a carbon monoxide-oxygen flame. The silica can be produced either with or without addition of water, for example in the purification step; preference is given to no addition of water.

Pyrogenic silica or silicon dioxide is, for example, known from Ullmann's Enzyklopädie der Technischen Chemie 4th edition, volume 21, page 464.

The unmodified pyrogenic silica has a specific BET surface area, measured in accordance with DIN EN ISO 9277/DIN 66132 of from 10 m$^2$/g to 600 m$^2$/g, preferably from 50 m$^2$/g to 400 m$^2$/g.

The unmodified pyrogenic silica preferably has a tamped density measured in accordance with DIN EN ISO 787-11 of from 10 g/l to 500 g/l, more preferably from 20 g/l to 200 g/l and most preferably from 30 g/l to 100 g/l.

The pyrogenic silica preferably has a fractal dimension of the surface of less than or equal to 2.3, more preferably less than or equal to 2.1, and most preferably from 1.95 to 2.05, with the fractal dimension of the surface $D_s$ being defined as: Particle surface area A is proportional to the particle radius R to the power of $D_s$.

The silica preferably has a fractal dimension of the mass $D_m$ of less than or equal to 2.8, more preferably less than or equal to 2.3, and most preferably from 1.7 to 2.1, as indicated, for example, in F. Saint-Michel, F. Pignon, A. Magnin, *J. COLLOID INTERFACE SCI.* 2003, 267, 314. The fractal dimension of the mass $D_m$ is defined as:

Particle mass M is proportional to particle radius R to the power of $D_m$.

The unmodified silica preferably has a density of surface silanol groups SiOH of less than 2.5 SiOH/nm$^2$, more preferably less than 2.1 SiOH/nm$^2$, still more preferably less than 2 SiOH/nm$^2$, and most preferably from 1.7 to 1.9 SiOH/nm$^2$, determined by a method described in G. W. Sears, *ANAL. CHEM.* 28 (1956) 1981.

It is possible to use silicas prepared by a wet chemical route or at high temperature (>1000° C.). Particular preference is given to pyrogenic silicas. It is also possible to use hydrophilic silicas which come in freshly prepared form directly from the burner, have been temporarily stored or are in commercial, packed form. Hydrophobicized metal oxides or silicas, e.g. commercial silicas, can also be used.

It is possible to use mixtures of various metal oxides or silicas, e.g. mixtures of metal oxides or silicas having different BET surface areas, or mixtures of metal oxides having differing degrees of hydrophobicization or silylation.

In a further preferred embodiment of the invention, colloidal silicon or metal oxides which are generally present as a dispersion of the corresponding oxide particles having a submicron size in an aqueous or organic solvent are used as particles (P). Here, it is possible to use, inter alia, the oxides of the metals aluminum, titanium, zirconium, tantalum, tungsten, hafnium and tin or the corresponding mixed oxides. Particular preference is given to silica sols. Examples of commercially available silica sols which are suitable for producing the particles (PS) are silica sols of the product series LUDOX® (Grace Davison), Snowtex® (Nissan Chemical), Klebosol® (Clariant) and Levasil® (H. C. Starck), or silica sols which can be prepared by the Stöber process.

In a further preferred embodiment of the invention, organopolysiloxanes of the general formula [4],

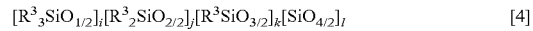

$$[R^3{}_3SiO_{1/2}]_i[R^3{}_2SiO_{2/2}]_j[R^3SiO_{3/2}]_k[SiO_{4/2}]_l \quad [4]$$

where

R$^3$ is an OH function, an unsubstituted or halogen-, hydroxyl-, amino-, epoxy-, phosphonato-, thiol-, (meth)acryl-, carbamate- or NCO-substituted hydro-carbon radical having 1-18 carbon atoms, where the carbon chain may be interrupted by nonadjacent oxygen, sulfur or NR$^{3'}$ groups, R$^{3'}$ has one of the meanings of R$^1$, i, j, k, l are each greater than or equal to 0, with the proviso that i+j+k+l is greater than or equal to 3, in particular at least 10, and that at least 1 radical R$^3$ is an OH function, are used as particles (P).

In a preferred embodiment of the invention, the silanes (S) used for modifying the particles (P) have a structure corresponding to the general formula [5],

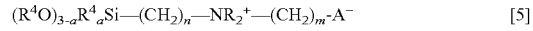

$$(R^4O)_{3-a}R^4{}_aSi-(CH_2)_n-NR_2{}^+-(CH_2)_m-A^- \quad [5]$$

where a is 0, 1 or 2 and n is 1, 2 or 3,

R$^4$ has one of the meanings of R$^1$ and R, A and m can have the meanings given for the formulae [1] to [4].

n is preferably 1 or 3.

In a further preferred embodiment of the invention, the silanes (S) used for modifying the particles (P) have a structure corresponding to the general formula [6],

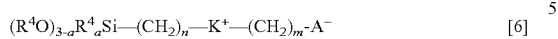   [6]

where
K is a substituted or unsubstituted aryl or hetero-aryl radical which has at least one tetravalent nitrogen ≡N—,
a is 0, 1 or 2 and
n is 1, 2 or 3,
and $R^4$, A, m and a can have the meanings given for the formulae [1] to [3] and [5].

The radical K is preferably an imidazolium, benzimidazolium, pyridinium, 8-mercaptoquinolinium, 2-mercaptobenzimidazolium, 2-mercaptobenzoxazolium, 2-mercaptobenzothiozolium, 3,5-dimethylpyrazolium, 1,2,4-triazolium or indolinium group. The groups $(R^4O)_{3-a}R^4{}_aSi—(CH_2)_n—$ and $—(CH_2)_m-A^-$ in the general formula [6] are preferably bound via the heteroatoms sulfur and/or nitrogen or carbon atoms of the radical K.

In a further preferred embodiment of the invention, the siloxanes (S) used for modifying the particles (P) have a structure corresponding to the general formula [7], $$[R^5{}_3SiO_{1/2}]_w[R^5{}_2SiO_{2/2}]_x[R^5SiO_{3/2}]_y[SiO_{4/2}]_z \quad [7]$$

where
$R^5$ is hydrogen or a substituted or unsubstituted hydrocarbon radical and has at least one halogen, an OH group or an alkoxy group and at least one structural element of the general formulae [1] to [3] and
w, x, y, z are each greater than or equal to 0,
with the proviso that w+x+y+z is greater than or equal to 3, in particular at least 10, and that at least 1 radical $R^5$ is an OH function.

Examples of silanes (S) which are preferably used for modifying the particles (P) are compounds of the general formulae [H1] to [H30] in which A is one of the radicals indicated for formulae [1] to [3].

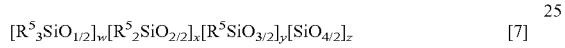 [H1]

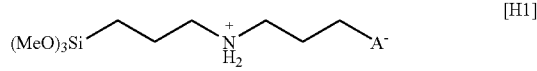 [H2]

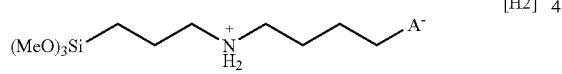 [H3]

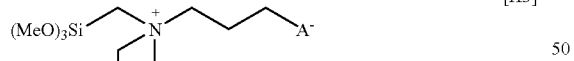 [H4]

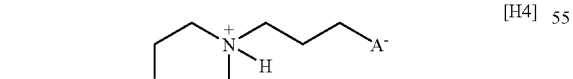 [H5]

 [H6]

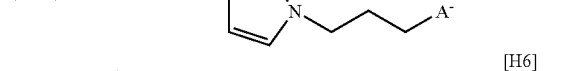 [H6]

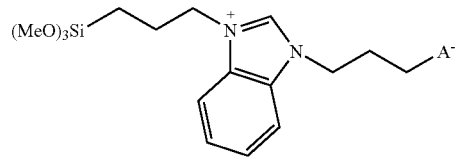 [H7]

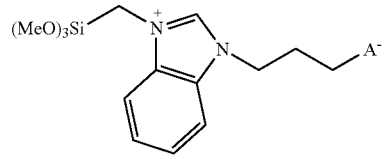 [H8]

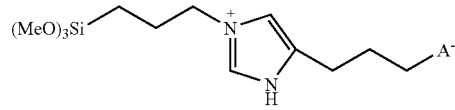 [H9]

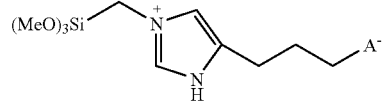 [H10]

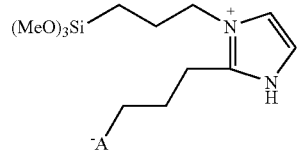 [H11]

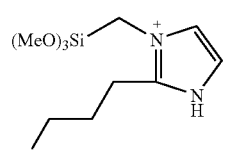 [H12]

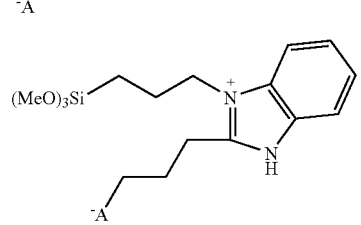 [H13]

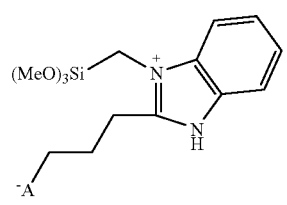 [H14]

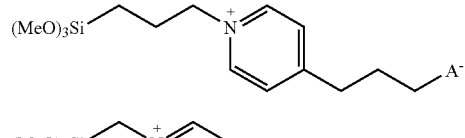 [H15]

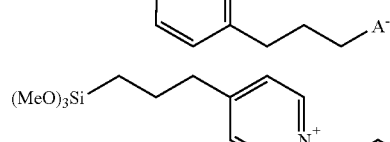 [H16]

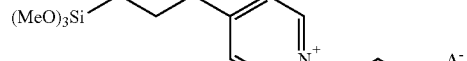 [H17]

-continued

[H18] 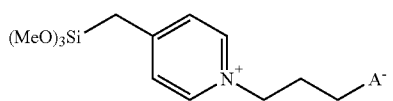

[H19] 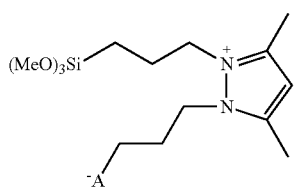

[H20] 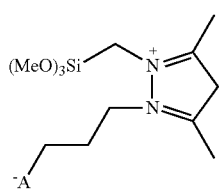

[H21] 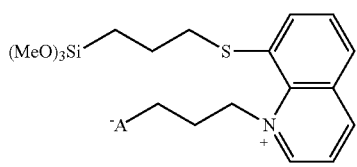

[H22] 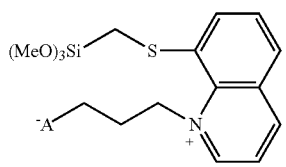

[H23] 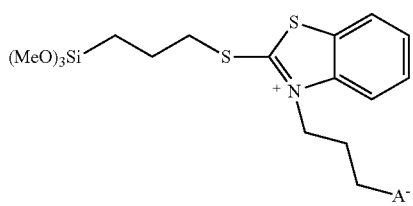

[H24] 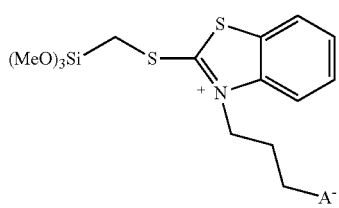

[H25] 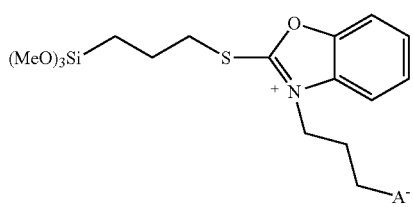

-continued

[H26] 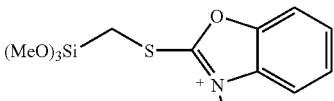

[H27] 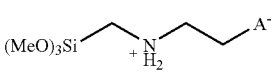

[H28] 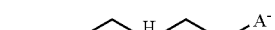

[H29] 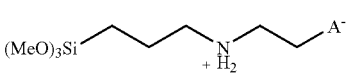

[H30]

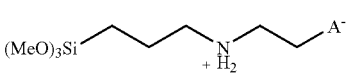

The silanes and siloxanes (S) are preferably obtained by reaction of the corresponding amino-functional silanes or siloxanes (S0) with alkyl sultones of the general formula [8], lactones of the general formula [9], ω-haloalkylcarboxylates of the general formula [10], ω-haloalkylsulfonates of the general formula [11], $$R^6\text{—O—SO}_2,\quad [8]$$

$$R^6\text{—O—C(O)},\quad [9]$$

$$X^1\text{—}(CR^1{}_2)_m\text{—C(O)OD},\quad [10]$$

$$X^1\text{—}(CR^1{}_2)_m\text{—SO}_3D,\quad [11]$$

where $R^6$ is a substituted or unsubstituted linear or branched aliphatic hydrocarbon radical, $X^1$ is chlorine, bromine or iodine and D is hydrogen, lithium, sodium or potassium and the radical $R^1$ and m can have the meanings given for the formulae [1] to [3].

$R^6$ is preferably a linear unsubstituted or fluorine-substituted alkyl radical.

In an alternative process, epoxy- or chloroalkyl-functional silanes or siloxanes (S1) are reacted with aminoalkylcarboxylates of the general formula [12] or aminoalkylsulfonates of the general formula [13] or aminoalkylphosphonates of the general formula [17], $$R_2N\text{—B—C(O)OD} \quad [12],$$

$$R_2N\text{—B—SO}_3D \quad [13],$$

$$R_2N\text{—B—P(O)(OR}^7)OD \quad [17],$$

where D is hydrogen, lithium, sodium or potassium and the radicals R, B and $R^7$ have the meanings given for the general formulae [1] to [3].

The silanes and siloxanes (S) containing the structural elements of the general formulae [1] to [3] in which A=P(O)(OR$^7$)O are preferably prepared in a two-stage process. In a first stage, an amino-functional phosphonic ester is prepared, for example, by reaction of amino-functional silanes or siloxanes (S0) with vinyl-functional phosphonic esters of the general formula [14], dialkylphosphonate-functional carboxylic esters of the general formula [15] or ω-haloalkyl-phosphonates of the general formula [16]

$$R^1C=CR^1-P(O)(OR^7)_2 \quad [14]$$

$$X-B-P(O)(OR^7)_2 \quad [15]$$

$$R^7-O-C(O)-B-P(O)(OR^7)_2 \quad [16]$$

where
$X^2$ is a halogen atom, preferably fluorine or chlorine, and B, $R^1$ and $R^7$ can have the meanings given for the general formulae [1] to [3].

In a second stage, the amino-functional phosphonic ester is hydrolyzed to the ammonioalkylphosphonate-functional silanes and siloxanes (S). The hydrolysis of the phosphonate groups is carried out by, for example, the method described by Barnes et al. in *J. ORG. CHEM.* 1960, 25, 1191-1194.

In these reactions, the structural elements of the general formulae [1] to [3] are formed. The reactions can be carried out either with or without a catalyst, but preference is given to carrying out the reactions without a catalyst. The reactions can be carried out either in bulk or in a solvent. The reagents of the general formulae [8] to [17] can be used in a substoichiometric amount, in an equimolar amount or in excess, based on the number of nitrogen atoms of the silanes and siloxanes (S0) or the number of epoxy or chloroalkyl groups of the silanes and siloxanes (S1). In a preferred variant, the reagents of the general formulae [8] to [17] are used in an equimolar amount.

Examples of useful compounds of the general formulae [8] to [17] are 1,3-propane sultone, 1,4-butane sultone, dihydrofuran-2-one, tetrahydropyran-2-one, oxepan-2-one, chloroacetic acid and its sodium and potassium salts, bromoacetic acid and its sodium and potassium salts, N,N-dimethylglycine, chloromethane-sulfonic acid and its sodium and potassium salts, bromomethanesulfonic acid and its sodium and potassium salts, diethyl bromomethylphosphonate, diethyl vinylphosphonate, methyl 3-diethoxyphosphorylpropionate, sodium 2-aminopropionate, taurine, its alkylated derivatives and its salts, 2-aminobenzenesulfonic acid, 3-aminobenzenesulfonic acid, 4-aminobenzenesulfonic acid, 3-aminopropanesulfonic acid, 3-aminopropanesulfonic acid and its sodium and potassium salts, 3-aminopropanephosphonic acid.

Examples of the amino-functional silanes used are aminopropyltrimethoxysilane, aminopropyltriethoxysilane, aminoethylaminopropyltrimethoxysilane, aminoethylaminopropyltriethoxysilane, ortho-aminophenyltriethoxysilane, meta-aminophenyltriethoxysilane, para-aminophenyltriethoxysilane, ortho-aminophenyltrimethoxysilane, meta-aminophenyltrimethoxysilane, para-aminophenyltrimethoxysilane, cyclohexylaminopropyltrimethoxysilane, cyclohexylaminopropyltrimethoxysilane, N,N-dimethylaminopropyltrimethoxysilane, N,N-dimethylaminopropyltriethoxysilane, aminomethyltrimethoxysilane, aminomethylmethyldimethoxysilane, aminomethyldimethylmethoxysilane, aminomethyltriethoxysilane, aminomethylmethyldiethoxysilane, aminomethyldimethylethoxysilane, cyclohexylaminomethyltrimethoxysilane, anilinomethyltrimethoxysilane, N-piperazinomethyltrimethoxysilane, N-piperazinomethyltriethoxysilane, N-piperazinomethylmethyldimethoxysilane, N-piperazinomethylmethyldiethoxysilane, N-piperazinomethyldimethylmethoxysilane, N-piperazinomethyldimethylethoxysilane, N,N-dimethylaminomethyltrimethoxysilane, N-benzimidazolylpropyltrimethoxysilane, N-benzimidazolylpropyltriethoxysilane, N-imidazolyltrimethoxysilane, N-imidazolyltriethoxysilane and the silanes described by VORONKOV et al. in *Chem. Heterocycl. Compd.* 2001, 37, 1358-1368.

Examples of useful amino-functional siloxanes (S0) are amino-functional linear or branched polydimethylsiloxanes or silicone resins which have a residual content of reactive silanol, alkoxysilyl or chlorosilyl groups.

Examples of useful epoxy-functional silanes are 3-glycidoxypropyltrimethoxysilane, 3-glycidoxypropyltriethoxysilane, 5,6-epoxyhexyltrimethoxysilane, 5,6-epoxyhexyltriethoxysilane, 2-(3,4-epoxycyclohexyl)-ethyltrimethoxysilane or 2-(3,4-epoxycyclohexyl)ethyltriethoxysilane.

Examples of suitable chlorosilanes are chloromethyldimethylmethoxysilane, chloromethylmethyldimethoxysilane, chloromethyltrimethoxysilane, chloromethyldimethylethoxysilane, chloromethylmethyldiethoxysilane, chloromethyltriethoxysilane, chloropropyldimethylmethoxysilane, chloropropylmethyldimethoxysilane, chloropropyltrimethoxysilane, chloropropyldimethylethoxysilane, chloropropylmethyldiethoxysilane and chloropropyltriethoxysilane.

To produce the particles of the invention (PS), the particles (P) are reacted with the silanes or siloxanes (S). The reaction is preferably carried out at from 0° C. to 150° C., particularly preferably from 20° C. to 80° C. The process can be carried out with inclusion of solvents or without solvents.

When solvents are used, protic and aprotic solvents and mixtures of various protic and aprotic solvents are suitable. Preference is given to using protic solvents, e.g. water, methanol, ethanol, isopropanol, or polar aprotic solvents, e.g. THF, DMF, NMP, diethyl ether or methyl ethyl ketone. Solvents or solvent mixtures having a boiling point or boiling range of up to 120° C. at 0.1 MPa are preferred.

The silanes (S) used for modifying the particles (P) are preferably used in an amount of greater than 1% by weight (based on the particles (P)), more preferably greater than 5% by weight, and most preferably greater than 8% by weight.

The reaction of the particles (P) with the silanes and siloxanes (S) is, as appropriate, carried out under reduced pressure, under superatmospheric pressure or at atmospheric pressure (0.1 MPa). Any dissociation products formed in the reaction, e.g. alcohols, can either remain in the product or/and be removed from the reaction mixture by applying reduced pressure or increasing the temperature.

Catalysts can be added in the reaction of the particles (P) with the silanes or siloxanes (S). Here, it is possible to use all catalysts which are customarily used for this purpose, for example organic tin compounds, e.g. dibutyltin dilaurate, dioctyltin dilaurate, dibutyltin diacetylacetonate, dibutyltin diacetate or dibutyltin dioctoate, etc., organic titanates, e.g. titanium(IV) isopropoxide, iron(III) compounds, e.g. iron (III) acetylacetonate, or else amines, e.g. triethylamine, tributylamine, 1,4-diazabicyclo[2.2.2]octane, 1,8-diazabicyclo [5.4.0]undec-7-ene, 1,5-diazabicyclo[4.3.0]non-5-ene, N,N-bis(N,N-dimethyl-2-aminoethyl)methylamine, N,N-dimethylcyclohexylamine, N,N-dimethylphenylamine, N-ethylmorpholine, etc. Organic or inorganic Brönsted acids such as acetic acid, trifluoroacetic acid, hydrochloric acid, phosphoric acid and its monoesters and/or diesters, e.g. butyl phosphate, isopropyl phosphate, dibutyl phosphate, etc., and acid chlorides such as benzoyl chloride are also suitable as catalysts. The catalysts are preferably used in concentrations of 0.01-10% by weight. The various catalysts can be used either in pure form or as mixtures of various catalysts.

The catalysts used are preferably deactivated by addition of anticatalysts or catalyst poisons after the reaction of the particles (P) with the silanes or siloxanes (S) before they can lead to cleavage of the Si—O—Si groups. This secondary reaction is dependent on the catalyst used and does not necessarily have to occur, so that it may also be possible to dispense with deactivation. Examples of catalyst poisons are the acids used for neutralizing bases employed or bases used for neutralizing acids employed. The products formed by the neutralization reaction can, if appropriate, be separated off or extracted by filtration. The reaction products preferably remain in the product.

The addition of water may be preferred for the reaction of the particles (P) with the silanes and siloxanes (S).

In the production of the particles (PS) from particles (P), it is possible to use other additional silanes (S2), silazanes (S3), siloxanes (S4) or other compounds (L) in addition to the silanes or siloxanes (S). The silanes (S2), silazanes (S3), siloxanes (S4) or other compounds (L) are preferably reactive toward the functions of the surface of the particle (P). The silanes (S2) and siloxanes (S4) have either silanol groups or hydrolyzable silyl functions, with the latter being preferred. The silanes (S2), silazanes (S3) and siloxanes (S4) can have organic functions, but it is also possible to use silanes (S1), silazanes (S3) and siloxanes (S4) without organic functions. The silanes and siloxanes (S) can be used as a mixture with the silanes (S2), silazanes (S3) or siloxanes (S4). As an alternative, the particles can also be functionalized successively with the various types of silane. Suitable compounds (L) are, for example, metal alkoxides such as titanium(IV) isopropoxide or aluminum(III) butoxide.

Particular preference is given to mixtures of silanes or siloxanes (S) with silanes (S2) of the general formula [18],

where

Z is a halogen atom, pseudohalogen radical, Si—N-bonded amine radical, amide radical, oxime radical aminoxy radical or acyloxy radical, b is 0, 1, 2 or 3, c is 0, 1, 2 or 3, d is 0, 1, 2 or 3, $R^8$ has one of the meanings of $R^1$ and a+b+c is less than or equal to 4.

Here, b is preferably 0, 1 or 2, while c and d are preferably each 0 or 1.

As silazanes (S3) or siloxanes (S4), particular preference is given to using hexamethyldisilazane or hexamethyldisiloxane or linear siloxanes having organo-functional chain ends.

The silanes (S2), silazanes (S3), siloxanes (S4) or other compounds (L) used for modifying the particles (P) are preferably used in an amount of greater than 1% by weight (based on the particles (P)).

If siloxanes of the general formula [4] are used for producing the particles (PS) from particles (P), the silanes or siloxanes (S) are attached by hydrolysis and/or condensation if the siloxane (P) of the general formula [4] has free Si—OH, Si—$OR^2$ or Si—X functions. If only Si—O—Si functions are present in the siloxane (P), the covalent bonding of the silanes or siloxanes (S) can be effected by means of an equilibration reaction. The procedure and the catalysts required for the equilibration reaction are well known to those skilled in the art and are widely described in the literature.

The modified particles (PS) obtained from the particles (P) can be isolated as powder by customary methods, for example by evaporation of the solvents used or by spray drying.

As an alternative, isolation of the particles (PS) can be dispensed with.

In addition, processes for deagglomerating the particles, e.g. pin milling, or apparatuses for milling and screening, e.g. pin mills, hammer mills, counter-current mills, impingement mills or apparatuses for milling and screening, can, in a preferred embodiment, be used for deagglomerating the particles after production of the particles (PS).

In a further preferred process, particles (P) comprising pyrogenic silica are used for producing the particles (PS). Here, the particles (PS) can be produced from pyrogenic silica by various methods.

In a preferred process, the dry pulverulent pyrogenic silica is reacted directly with the very finely divided silanes (S), if appropriate in admixture with other silanes (S1), silazanes (S2) or siloxanes (S3).

The process can be carried out continuously or batch-wise and be made up of one or more steps. The modified pyrogenic silica (PS) is preferably produced by means of a process which is carried out in separate steps: (A) firstly preparation of the hydrophilic pyrogenic silica (P), (B) modification of the hydrophilic pyrogenic silica (P) by (1) loading of the hydrophilic pyrogenic silica with silanes (S), (2) reaction of the pyrogenic silica with the applied compounds and (3) purification of the pyrogenic silica by removal of excess applied compounds and dissociation products.

The surface treatment is preferably carried out in an atmosphere containing less than 10% by volume of oxygen, more preferably less than 2.5% by volume; best results are achieved at less than 1% by volume of oxygen.

Loading, reaction and purification can be carried out as a batchwise or continuous process.

Loading (step B1) is carried out at temperatures of from −30° C. to 250° C., preferably at temperatures of from 20° C. to 150° C., and more preferably at temperatures of from 20° C. to 80° C. In a specific embodiment, the loading step is carried out at from 30° C. to 50° C.

The residence time is from 1 minute to 24 hours, preferably from 15 minutes to 240 minutes, and for reasons of the space-time yield most preferably from 15 minutes to 90 minutes.

The pressure during loading ranges from a slightly subatmospheric pressure to 0.2 bar and up to a gauge pressure of 100 bar, with atmospheric pressure, i.e. no applied pressure above ambient/atmospheric pressure, being preferred for engineering reasons.

The silanes (S) or their mixtures are preferably added in liquid form, and are most preferably mixed into the pulverulent metal oxide (P). The compounds can be admixed in pure form or as solutions in known industrially used solvents, for example alcohols such as methanol, ethanol or i-propanol, ethers such as diethyl ether, THF or dioxane or hydrocarbons such as hexanes or toluene. The concentration in the solution is 5-95% by weight, preferably 30-95% by weight, and most preferably 50-95% by weight.

The silanes are preferably mixed in by means of nozzle techniques or comparable techniques, e.g. effective atomization techniques such as atomization in 1-fluid nozzles under superatmospheric pressure (preferably at from 5 to 20 bar), spraying in 2-fluid nozzles under superatmospheric pressure (preferably gas and liquid 2-20 bar), very fine dispersion by means of atomizers or gas-solid exchange apparatuses having movable, rotating or static internals which allow homogeneous application of the silanes (S) to the pulverulent pyrogenic silica (P).

The silanes (S) are preferably added as very finely divided aerosol having a settling velocity of 0.1-20 cm/s.

The loading of the silica (P) and the reaction with the silanes (S) are preferably carried out with mechanical or gas-borne fluidization. Mechanical fluidization is particularly preferred.

Gas-borne fluidization can be effected by means of all inert gases, preferably $N_2$, Ar, other noble gases, $CO_2$, etc. The gases for fluidization are preferably fed in at superficial gas velocities in the range from 0.05 to 5 cm/s, more preferably from 0.5 to 2.5 cm/s. Particular preference is given to mechanical fluidization carried out without additional introduction of gas beyond that required to make the system inert by means of propeller stirrers, anchor stirrers and other suitable stirring devices.

The reaction is preferably carried out at temperatures of from 40° C. to 200° C., more preferably at temperatures of from 40 to 160° C. and most preferably at temperatures of from 80° C. to 150° C.

The reaction time ranges from 5 minutes to 48 hours, preferably from 10 minutes to 4 hours.

Protic solvents such as liquid or vaporizable alcohols or water can be added if appropriate; typical alcohols are isopropanol, ethanol and methanol. It is also possible to add mixtures of the abovementioned protic solvents. Preference is given to adding from 1 to 50% by weight of protic solvents based on the metal oxides, more preferably from 5 to 25% by weight. Particular preference is given to water.

If desired, acid catalysts having acidic character in the sense of a Lewis or a Brönsted acid, e.g. hydrogen chloride, or basic catalysts having basic character in the sense of a Lewis base or a Brönsted base, e.g. ammonia or amines such as triethylamine, can be added. These are preferably added in traces, i.e. less than 1000 ppm. Particular preference is given to not adding any catalysts.

The purification is preferably carried out at a purification temperature of from 20° C. to 200° C., more preferably from 50° C. to 180° C., and most preferably from 50° C. to 150° C. The purification step is preferably carried out with agitation, more preferably slow agitation and gentle mixing. The stirring devices are advantageously set and moved so that mixing and fluidization preferably occur, but not complete vortexing.

The purification step can also be carried out with increased gas input, corresponding to a superficial gas velocity of preferably from 0.001 to 10 cm/s, more preferably from 0.01 to 1 cm/s. This can be effected by means of all inert gases, preferably $N_2$, Ar, other noble gases, $CO_2$, etc.

In addition, processes for mechanical compaction of the silica can be employed during modification or after purification, for example pressing rollers, milling apparatuses such as pan mills and ball mills, continuously or batchwise, compaction by means of screws or screw mixers, screw compressors, briquetting apparatuses or compaction by evacuating the air or gas present by means of suitable vacuum methods.

Particular preference is given to mechanical compaction during modification in step B2 of the reaction, by means of pressing rollers, milling apparatuses as mentioned above, e.g. ball mills, or compaction by means of screws, screw mixers, screw compressors, or briquetting apparatuses.

In a further particularly preferred embodiment, processes for mechanical compaction of the silica, e.g. compaction by evacuating the air or gas present by means of suitable vacuum methods or pressing rollers or combinations of two processes, are employed after purification.

In addition, in a particularly preferred embodiment, processes for deagglomeration of the silica, e.g. pin mills, hammer mills, countercurrent mills, impingement mills or apparatuses for milling and screening, can be used after purification.

In a further preferred process, dispersions of the hydrophilic pyrogenic silica (P) in water or typical industrially used solvents, for example alcohols such as methanol, ethanol, i-propanol, ketones such as acetone, methyl ethyl ketone, ethers such as diethyl ether, THF, hydrocarbons such as pentane, hexanes, aromatics such as toluene or other volatile solvents such as hexamethyldisiloxane or mixtures thereof with silanes (S) are reacted.

The process can be carried out continuously or batchwise and can comprise one or more steps. Preference is given to a continuous process. The modified pyrogenic silica is preferably produced by means of a process in which the silica (1) is mixed into one of the abovementioned solvents, (2) reacted with the silanes (S) and (3) freed of solvents, excess silanes and by-products.

Dispersion (1), reaction (2) and drying (3) are preferably carried out in an atmosphere containing less than 10% by volume of oxygen, more preferably less than 2.5% by volume; best results are achieved at less than 1% by volume of oxygen.

Mixing (1) can be carried out by means of customary mixing apparatuses such as anchor stirrers or beam stirrers. If appropriate, mixing can be carried out under high shear by means of dissolver disks, rotor-stator apparatuses, if appropriate with direct introduction into the shearing gap, by means of ultra-sonic transducers or by means of milling apparatuses such as ball mills. If appropriate, a plurality of various apparatuses of the type mentioned above can be used in parallel or in series.

To carry out the reaction (2) of the silanes (S) with the silica (P), the silanes are, either in pure form or as a solution in suitable solvents, added to the silica dispersion and homogeneously mixed. The addition of the silanes (s) can be carried out in the vessel used for preparing the dispersion or in a separate reaction vessel. If the silanes are added in the dispersion vessel, this can be carried out in parallel with or after dispersion. The silanes (S) can, if appropriate, be added as a solution in the dispersion medium directly in the dispersing step.

Water is added to the reaction mixture if appropriate. If appropriate, acid catalysts such as Brönsted acids, e.g. liquid or gaseous HCl, sulfuric acid, phosphoric acid or acetic acid, or basic catalysts such as Brönsted bases, e.g. liquid or gaseous ammonia, amines such as $NEt_3$ or NaOH, are added to the reaction mixture.

The reaction step is carried out at a temperature of from 0° C. to 200° C., preferably from 10° C. to 180° C., and most preferably from 20° C. to 150° C.

The removal of solvents, excess silanes (S) and by-products (3) can be effected by means of dryers or spray dryers.

If appropriate, the drying step can be followed by a heating step to complete the reaction.

Heating is carried out at a temperature of from 50° C. to 350° C., preferably from 50° C. to 200° C. and most preferably from 80° C. to 150° C.

In addition, drying or heating can be followed by processes for mechanical compaction of the silica (PS), for example pressing rollers, milling apparatuses such as pan mills and ball mills, continuously or batchwise, compaction by means of screws or screw mixers, screw compressors, briquetting apparatuses or compaction by sucking out of the air or gas present by means of suitable vacuum methods.

In a further particularly preferred embodiment, processes for mechanical compaction of the silica, e.g. compaction by evacuating of the air or gas present by means of suitable vacuum methods or pressing rollers or combinations of two processes, are used after drying or heating.

In addition, processes for deagglomeration of the silica, e.g. pin mills, hammer mills, countercurrent mills, impingement mills or apparatuses for milling and screening, can be employed after drying or heating in a particularly preferred embodiment.

The invention further provides aqueous dispersions (W) containing the particles of the invention (PS).

To produce the dispersions (W), the particles of the invention (PS) can be introduced into the aqueous liquid and incorporated by spontaneous wetting or by shaking, e.g. by means of a tumble mixer, or a high-speed mixer or by stirring, e.g. by means of a beam stirrer or dissolver disk. At low particle concentrations below 10% by weight, simple stirring is generally sufficient for incorporating the particles into the liquid. The particles (PS) are preferably incorporated into the liquid at a high shear rate. After or in parallel with incorporation, the particles (PS) are dispersed. Preference is given to parallel dispersion. This can be effected by means of a dispersing system in the first vessel or by pumping into external pipes containing a dispersing device from the vessel, with preferably closed recirculation into the vessel. This process can preferably be made continuous by partial recirculation and partial continuous withdrawal.

This incorporation is preferably carried out using high-speed stirrers, high-speed dissolver disks, e.g. with circumferential velocities of 1-50 m/s, high-speed rotor-stator systems, sonicators, shear gaps, nozzles, or ball mills.

A particularly useful method of dispersing the particles of the invention (PS) in the aqueous dispersion of the invention (W) is the use of ultrasound in the range from 5 Hz to 500 kHz, preferably from 10 kHz to 100 kHz, and most preferably from 15 kHz to 50 kHz; ultrasonic dispersion can be carried out continuously or batchwise. This can be effected by means of individual ultrasonic transducers, e.g. ultrasonic probes, or in flow systems, if appropriate systems separated by means of a pipe or tube wall, containing one or more ultrasonic transducers.

The aqueous dispersions (W) can be produced by batch or continuous processes. Preference is given to continuous processes.

Of course, the aqueous dispersion of the invention (W) can also be produced in another way. However, it has been found that the procedure is critical and not all methods of production give stable dispersions.

The processes have the advantage that they are very simple to carry out and make it possible to produce aqueous dispersions (W) having very high solids contents.

The aqueous dispersions of the invention (W) preferably have a content of particles according to the invention (PS) of 5-60% by weight, more preferably 5-50% by weight, yet more preferably 10-40% by weight and most preferably 15-35% by weight.

The aqueous dispersions of the invention (W) having a high content of particles according to the invention (PS) are notable, in particular, for the ability to obtain low-viscosity dispersions This means that dispersions, preferably having a particle content of preferably from 5 to 60% by weight, have a viscosity of less than 1000 mPas, preferably a viscosity of from 800 to 10 mPas, and more preferably a viscosity of from 700 to 50 mPas, with the viscosity being measured by a cone-and-plate sensor system having a measurement gap of 105 µm, at 25° C. and a shear rate of $10\ s^{-1}$.

The aqueous dispersions of the invention (W) having a high content of particles according to the invention (PS) also have an excellent storage stability. This means that the viscosity of a dispersion has risen by a factor of not more than 1.5, preferably a factor of not more than 1.25, more preferably a factor of not more than 1.1 and most preferably a factor of 1, after storage at 40° C. for 4 weeks compared to the viscosity directly after production of the dispersion, with the viscosity being measured by means of a cone-and-plate sensor system having a 105 µm measurement gap, at 25° C. and a shear rate of $10\ s^{-1}$.

The aqueous dispersions of the invention (W) having a high content of particles according to the invention (PS) also have an excellent storage stability. This means that the dispersions have a flow limit of less than 100 Pa, preferably less than 10 Pa, more preferably less than 1 Pa and most preferably less than 0.1 Pa, in each case measured at 25° C. by the vane method of Q. D. Nguyen, D. Boger, J. Rheol. 1985, 29, 335, after storage at 40° C. for 4 weeks.

Furthermore, the aqueous dispersions according to the invention (W) having a high content of particles according to the invention (PS) have an average particle size, measured as average hydrodynamic equivalent diameter in the form of the number average by photon correlation spectroscopy, of less than 1000 nm, preferably from 1 nm to 800 nm and most preferably from 10 nm to 500 nm.

The aqueous dispersions of the invention (W) can, if appropriate, contain fungicides or bactericides such as methylisothiazolones or benzisothiazolones.

The invention further provides for the use of the particles of the invention (PS) for producing composite materials (C).

The composite materials (C) are produced using either inorganic or organic polar, basic, acidic or ionic matrix materials (M). Examples of such polymer matrices (M) are polyamides, polyimides, polycarbonates, polyesters, polyetherimides, polyether sulfones, polyphenylene oxides, polyphenylene sulfides, polysulfones (PSU), polyphenyl sulfones (PPSU), polyurethanes, polyvinyl chlorides, polytetrafluoroethylenes (PTFE), polystyrenes (PS), polyvinyl alcohols (PVA), polyether glycols (PEG), polyphenylene oxides (PPO), polyaryl ether ketones and sulfonated organic polymers. Particularly useful polymer matrices are sulfonated organic polymers, for example sulfonated polysulfones, sulfonated polyaryl ether ketones (s-PEK, s-PEEK, s-PEEKK, s-PEKK, s-PEKEKK), sulfonated polyether sulfones (PES), sulfonated polyphenyl ether sulfones (s-PPSU), sulfonated polyimides, sulfonated styrene-ethylene copolymers (s-SES), sulfonated polystyrenes, sulfonated styrene-butadiene copolymers (s-SBS), sulfonated perfluorinated polymers (e.g. Nafion®), partially fluorinated sulfonated polymers and sulfonated amine polymers such as sulfonated polybenzimidazoles, alkyl-sulfonated polybenzimidazoles, sulfoarylated polybenzimidazoles and sulfonated imidazoles.

Further suitable matrix materials (M) are purely basic polymers, e.g. polybenzimidazoles, polyimidazoles and polyamides.

Other polymers which are likewise suitable as matrix (M) are oxidic materials which can be obtained by customary sol-gel processes known to those skilled in the art. In the sol-gel process, hydrolyzable and condensable silanes and/or organometallic reagents are hydrolyzed by means of water and optionally in the presence of a catalyst and are cured by suitable methods to give the siliceous or oxidic materials.

If the silanes or organometallic reagents bear organo-functional groups (e.g. epoxy, methacrylic, amine groups) which can be employed for crosslinking, these modified sol-gel materials can additionally be cured via their organic content.

Curing of the organic content can, for example, be effected, if appropriate after addition of further reactive organic components, thermally or by means of UV radiation. For example, sol-gel materials which can be obtained by reaction of an epoxy-functional alkoxysilane with an epoxy resin in the presence or absence of an amine hardener are suitable as matrix (M). A further example of such inorganic-organic polymers is sol-gel materials (M) which can be produced from amino-functional alkoxysilanes and epoxy resins.

Introduction of the organic component enables, for example, the elasticity of a sol-gel film to be improved.

Such inorganic-organic polymers are described, for example, in Thin Solid Films 1999, 351, 198-203.

If the silanes or organometallic reagents bear acidic groups such as carboxylic acid, sulfonic acid or phosphonic acid groups or basic groups such as amino groups, oxidic materials which in turn contain acidic or basic groups are obtained in the course of the sol-gel process. The acidic or basic groups are preferably covalently bound to the silyl group via nonhydrolyzable spacers (e.g. alkyl radicals).

Oxidic sol-gel materials which have zwitterionic groups can be obtained correspondingly using silanes or organometallic compounds which contain structural elements selected from among the general formulae [1] to [3].

Examples of siliceous materials which are suitable as matrix material (M) are described, inter alia, in DE 10163518.

In addition, mixtures of various matrix polymers or the corresponding copolymers are also suitable as matrix materials (M).

In addition, reactive resins can also be used as matrix material (M). For the present purposes, reactive resins are compounds which have one or more reactive groups. Examples of reactive groups which may be mentioned here are hydroxy, amino, isocyanate, epoxide groups, ethylenically unsaturated groups and moisture-crosslinking alkoxysilyl groups. The reactive resins can be polymerized in the presence of a suitable hardener or initiator by means of thermal treatment or actinic radiation. The reactive resins can be present in monomeric, oligomeric and polymeric form. Examples of customary reactive resins are: hydroxy-functional resins such as hydroxyl-containing polyacrylates or polyesters which can be crosslinked by means of isocyanate-functional hardeners; acrylic- and methacrylic-functional resins which can, after addition of an initiator, be cured thermally or by means of actinic radiation; epoxy resins which are crosslinked by means of amine hardeners; vinyl-functional siloxanes which can be crosslinked by reaction with an SiH-functional hardener; SiOH-functional siloxanes which can be cured by polycondensation.

In the composite materials of the invention (C), there is a strong interaction between the zwitterionic particles (PS) and the polar or ionic matrix (M). This interaction is, in particular, critical to the excellent mechanical properties of the materials. Depending on the type of matrix material (M) used and, if appropriate, its basic or acidic groups, the interaction with the zwitterionic particles of the invention (PS) can be controlled. Thus, for example, when a basic polymer (M) is used, a negative overall charge of the particles can be achieved. In this case, the reinforcement of the polymer can be attributed, inter alia, to the interaction of negatively charged particles (PS) and the positively charged matrix (M).

The particles of the invention (PS) can have a distribution gradient in the composite material (C) or be homogeneously distributed. Depending on the matrix system chosen, a homogeneous distribution or a nonuniform distribution of the particles can have an advantageous effect on the mechanical stability, the proton conductivity and the control of the permeability for gases and liquids.

If the particles of the invention (PS) bear organo-functional groups which are reactive toward a reactive resin (M), the particles (PS) can be bound covalently to the matrix (M) after dispersion of the particles.

The amount of particles (PS) present in the composite material (C) is, based on the total weight, preferably at least 1% by weight, more preferably at least 5% by weight, particularly preferably at least 10%, and preferably not more than 90% by weight.

Here, the composite materials (C) can contain one or more different types of particles (PS). Thus, for example, the invention encompasses composites (C) which contain modified silicon dioxide and modified aluminophosphate.

The composite materials (C) are preferably produced in a two-stage process. In a first stage, dispersions (D) are produced by incorporating the particles (PS) into the matrix material (M). In a second step, the dispersions (D) are converted into the composite materials (C).

To produce the dispersions (D), the matrix material (M) and the particles of the invention (PS) are dissolved or dispersed in a solvent, preferably a polar aprotic or protic solvent, or a solvent mixture. Suitable solvents are dimethylformamide, dimethylacetamide, dimethyl sulfoxide, N-methyl-2-pyrrolidone, water, ethanol, methanol, propanol. The matrix (M) can be added to the particles (PS) or the particles (PS) can be added to the matrix (M). To disperse the particles (PS) in the matrix material (M), it is possible to use further additives and auxiliaries customarily used for dispersion. Mention may here be made of Brönsted acids such as hydrochloric acid, phosphoric acid, sulfuric acid, nitric acid, trifluoroacetic acid, acetic acid, methylsulfonic acid, Brönsted bases such as triethylamine and ethyldiisopropylamine. In addition, all customary emulsifiers and/or protective colloids can be used as further additives. Examples of protective colloids are polyvinyl alcohols, cellulose derivatives or vinylpyrrolidone-containing polymers. Customary emulsifiers are, for example, ethoxylated alcohols and phenols (alkyl radical $C_4$-$C_{18}$, EO units 3-100), alkali metal and ammonium salts of alkyl-sulfates ($C_3$-$C_{18}$), sulfuric esters and phosphoric esters and alkylsulfonates.

Particular preference is given to sulfosuccinic esters and alkali metal alkylsulfates and polyvinyl alcohols. It is also possible to use a plurality of protective colloids and/or emulsifiers as a mixture.

If particles (PS) and matrix (M) are solids, the dispersions (D) can also be produced by a melting or extrusion process.

As an alternative, the dispersion (D) can be produced by modifying particles (P) in the matrix material (M). For this purpose, the particles (P) are dispersed in the matrix material (M) and subsequently reacted with the silanes or siloxanes (S) to form the particles (PS).

If the dispersions (D) contain aqueous or organic solvents, the corresponding solvents are removed after the dispersion (D) has been produced. Removal of the solvent is preferably effected by distillation. As an alternative, the solvent can remain in the dispersion (D) and be removed by drying during the course of the production of the composite material (C).

The dispersions (D) can also contain customary solvents and the additives and auxiliaries customary in formulations. Mention may here be made of, inter alia, leveling auxiliaries, surface-active substances, bonding agents, light stabilizers such as UV absorbers and/or free-radical scavengers, thixotropes and further solids and fillers. To produce the property profiles desired in each case for both the dispersions (D) and the composites (C), such auxiliaries are preferred.

To produce the composite materials (C), the dispersions (D) containing particles (PS) and matrix (M) are applied to a substrate by means of a doctor blade. Further methods are dipping, spraying, casting and extrusion processes. Suitable substrates are, inter alia, glass, metal, wood, silicon wafers, PTFE. If the dispersions (D) contain solvents, the composites (C) are dried by evaporating the solvent.

If the dispersions (D) are mixtures of particles (PS) and reactive resins (M), the dispersions are preferably cured by means of actinic radiation or thermal energy after addition of a hardener or initiator.

As an alternative, the composite materials (C) can be produced by forming the particles according to the invention (PS) in the matrix (M). A customary method of producing these composite materials (C) is the sol-gel synthesis in which the particle precursors, e.g. hydrolyzable organometallic or organosilicon compounds, and the silanes or siloxanes (S) are dissolved in the matrix (M) and particle formation is subsequently initiated, for example by addition of a catalyst. Suitable particle precursors are tetraethoxysilane, tetramethoxysilane, methyltrimethoxysilane, phenyltrimethoxysilane, etc. To produce the composites (C), the sol-gel mixtures are applied to a substrate and dried by evaporation of the solvent.

In a method which is likewise preferred, a cured polymer is swelled by means of a suitable solvent and dipped into a solution containing, for example, hydrolyzable organometallic or organosilicon compounds as particle precursors and the silanes or siloxanes (S). Particle formation of the particle precursors concentrated in the polymer matrix is then initiated by one of the abovementioned methods.

The composite materials (C) which can be obtained from the dispersions (D) display a surprisingly high mechanical stability and a proton conductivity which is drastically increased compared to the particle-free polymer.

The composite materials (C) can, owing to their excellent chemical, thermal and mechanical properties, be used as, in particular, adhesives and sealants, coatings and as sealing and embedding compositions. Since the composite materials of the invention (C) display, when the components are chosen appropriately, excellent mechanical properties combined with a high proton conductivity, these materials are particularly suitable as membranes in fuel cells. Particular preference is given to fuel cells of the PEMFC (polymer electrolyte membrane fuel cell), PAFC (phosphoric acid fuel cell) and DMFC type (direct methanol fuel cell). Further possible fields of use of the materials of the invention (C) as polymer membranes encompass use in electrolysis, in capacitors and in battery systems. Preferred proton-conducting polymer electrolyte membranes (PEM) which can be used for producing fuel cells are made up of polymers (M) which have covalently bound proton-conducting groups, in particular carboxylic acid, sulfonic acid, phosphonic acid or amino groups. Examples of proton-conducting polymers which can be used for producing polymer electrolyte membranes are sulfonated perfluorinated hydrocarbons, sulfonated polyether ketones, sulfonated polysulfones, sulfonated polyphenyl sulfides, sulfonated polybenzimidazoles, sulfonated polystyrenes, polybenzimidazoles, siliceous or oxidic materials and mixtures of these polymers.

In a further embodiment of the invention, the particles of the invention (PS) display a high thickening action in polar systems such as solvent-free polymers and resins or solutions, suspensions, emulsions and dispersions of organic resins, in aqueous systems or in organic solvents (e.g. polyesters, vinyl esters, epoxides, polyurethanes, alkyd resins, etc.) and are thus suitable as rheological additives in these systems.

The particles (PS) as rheological additive in these systems give the required viscosity, nonnewtonian viscosity, thixotropy and a flow limit which is sufficient for remaining in position on vertical surfaces.

In a further embodiment of the invention, the surface-modified particles (PS) prevent caking or lump formation, e.g. in the presence of moisture, in pulverulent systems and also do not tend to reagglomerate and thus lead to undesirable separation but instead keep powders in a free-flowing condition and thus make it possible to obtain loading-stable and storage-stable mixtures. In general, amounts of particles of from 0.1 to 3% by weight based on the pulverulent system are used.

This applies in particular to use in nonmagnetic and magnetic toners and developers and charge control auxiliaries, e.g. in contactless or electrophotographic printing/reproduction processes. These can be 1- and 2-component systems. This also applies in pulverulent resins which are used as surface coatings.

The invention further provides for the use of the particles (PS) in toners, developers and charge control auxiliaries. Such developers and toners are, for example, magnetic 1-component and 2-component toners and also nonmagnetic toners. These toners can comprise resins such as styrene resins and acrylic resins as main constituent and can preferably be milled to particle distributions in the range 1-100 µm or be resins which have been produced in polymerization processes in dispersion or emulsion or solution or in bulk to give particle distributions in the range of preferably 1-100 µm. Silicon oxide and metal oxide are preferably used for improving and controlling the powder flow behavior and/or for regulating and controlling the triboelectrical charging properties of the toner or developer. Such toners and developers can be used in electrophotographic printing processes and can also be used in direct image transfer processes.

The particles of the invention (PS) and their aqueous dispersions according to the invention (W) are also suitable for producing paper coatings as are used, for example, for high-gloss photo papers.

The particles of the invention (PS) and their aqueous dispersions according to the invention (W) can additionally be used for stabilizing particle-stabilized emulsions, known as Pickering emulsions.

All symbols in the above formulae have their meanings independently of one another. In all formulae, the silicon atom is tetravalent.

Unless indicated otherwise, all amounts and percentages are by weight, all pressures are 0.10 MPa (abs.) and all temperatures are 20° C.

Example 1

Preparation of an Ammoniopropylsulfonate-Functional Silane (Silane 1)

Reaction of Aminopropyltrimethoxysilane with 1,3-propane sultone 18.8 g (0.15 mol) of 1,3-propane sultone are added dropwise to a solution of 26.9 g (0.15 mol) of aminopropyltrimethoxysilane in 100 ml of toluene. The reaction mixture is heated at 60° C. for 6 hours, the precipitate which forms is filtered off, the precipitate is washed with ethyl acetate and the product is dried under reduced pressure. This gives 35 g of a colorless solid.

Example 2

Preparation of an Ammoniopropylsulfonate-Functional Silane (Silane 2)

Reaction of Piperazinomethyltriethoxysilane with 1,3-Propane Sultone 1.88 g (15.0 mmol) of 1,3-propane sultone are added dropwise to a solution of 3.90 g (15.0 mmol) of piperazinomethyltriethoxysilane in 10 ml of toluene. The reaction mixture is heated at 60° C. for 6 hours, the reaction mixture is allowed to cool and the phases are separated. The lower phase is evaporated to dryness under reduced pressure. Boiling with ethyl acetate gives 2.70 g of an orange solid.

Example 3

Preparation of an Ammoniobutylsulfonate-Functional Silane (Silane 3)

Reaction of Aminopropyltrimethoxysilane with 1,4-Butane Sultone 1.10 g (8.20 mmol) of 1,4-butane sultone are added dropwise to a solution of 1.47 g (8.20 mmol) of aminopropyltrimethoxysilane in 5 ml of toluene. The reaction mixture is refluxed for 6 hours, then allowed to cool and the phases are separated. The lower phase is evaporated to dryness under reduced pressure. Boiling with ethyl acetate gives 1.20 g of a yellow solid.

Example 4

Preparation of a Benzimidazoliopropylsulfonate-Functional Silane (Silane 4)

15.5 g (0.13 mol) of benzimidazole were added to an initial charge of 50 ml of a 2.6 molar sodium methoxide solution in methanol and the mixture was stirred at room temperature for 1 hour. After evaporation of the solvent, the residue was taken up in dry DMF and admixed with 3 mg of 18-crown-6 and 26.1 g (0.13 mol) of γ-chloropropyltrimethoxysilane. The reaction mixture was heated at 90° C. for 2 hours, cooled to room temperature and the precipitate formed was isolated by filtration.

5.00 g of the isolated intermediate were dissolved in 20 ml of toluene and admixed with 2.18 g (17.9 mmol) of 1,3-propane sultone. The mixture was heated at 60° C. for 6 hours, cooled to room temperature and the product formed was washed with toluene and ethyl acetate. This gave 7.19 g of a colorless solid.

Example 5

Preparation of a Concentrated Ammoniopropylsulfonate-Functional Silica Sol 15.0 g of $H_2O$ are added to 15.0 g of an aqueous $SiO_2$ sol (LUDOX® AS 40 from Grace Davison, 40% by weight $SiO_2$, pH=9.1, 22 nm). 1.20 g of the silane 1 described in example 1 is then added over a period of 1 minute and the mixture is stirred at 25° C. for 2 hours and at 70° C. for 2 hours. This gives a modified silica sol which displays a slight Tyndall effect. The silica sol which has been modified in this way has a negative ZETA potential of −38 mV at pH 8.8. At a pH of ≦7, aggregation of the particles is observed.

Example 6

Preparation of a Concentrated Ammoniopropylsulfonate-Functional Silica Sol 15.0 g of $H_2O$ are added to 15.0 g of an aqueous $SiO_2$ sol (LUDOX® AS 40 from Grace Davison, 40% by weight $SiO_2$, pH=9.1, 22 nm). 1.20 g of the silane 3 described in example 3 is then added over a period of 1 minute and the mixture is stirred at 25° C. for 2 hours and at 70° C. for 2 hours. This gives a modified silica sol which displays a slight Tyndall effect. The silica sol which has been modified in this way has a negative ZETA potential of −41 mV at pH 9. At a pH of ≦6, aggregation of the particles is observed.

Example 7

Preparation of a Concentrated Ammoniopropylsulfonate-Functional Silica Sol 15.0 g of $H_2O$ are added to 15.0 g of an aqueous $SiO_2$ sol (LUDOX® AS 40 from Grace Davison, 40% by weight $SiO_2$, pH=9.1, 22 nm). 1.20 g of the silane 4 described in example 4 is then added over a period of 1 minute and the mixture is stirred at 25° C. for 2 hours and at 70° C. for 2 hours. This gives a modified silica sol which displays a slight Tyndall effect. The silica sol which has been modified in this way has a negative ZETA potential of −53 mV at pH 9.3. At a pH of ≦5.5, aggregation of the particles is observed.

The ZETA potential of the silica sols from examples 5, 6 and 7 was determined by means of a DT 1200 from Dispersion Technologies. The pH was set by means of 1% strength by weight sulfuric acid.

Example 8

Preparation of an Ammoniopropylsulfonate-Functional Silica Sol 0.80 g of the silane 2 described in example 2 is added to 10.0 g of an aqueous $SiO_2$ sol (LUDOX® AS 40 from Grace Davison, 40% by weight $SiO_2$, pH=9.1, 22 nm) over a period of 1 minute and the mixture is stirred at 25° C. for 16 hours. The solution is then diluted with 190.0 g of $H_2O$ and the pH is set to 5 by means of 10% strength by weight sulfuric acid. This gives a modified silica sol which displays a slight Tyndall effect.

Example 9

Preparation of an Ammoniopropylsulfonate-Functional Silica Sol 0.80 g of the silane 3 described in example 3 is added to 10.0 g of an aqueous $SiO_2$ sol (LUDOX® AS 40 from Grace Davison, 40% by weight $SiO_2$, pH=9.1, 22 nm) over a period of 1 minute and the mixture is stirred at 25° C. for 2 hours and at 70° C. for a further 2 hours. The solution is then diluted with 190 g of $H_2O$ and the pH is set to 5 by means of 10% strength by weight sulfuric acid. This gives a modified silica sol which displays a slight Tyndall effect.

Example 10

Preparation of an Ammoniopropylsulfonate-Functional Silica Sol 0.80 g of the silane 4 described in example 4 is added to 10.0 g of an aqueous $SiO_2$ sol (LUDOX® AS 40 from Grace Davison, 40% by weight $SiO_2$, pH=9.1, 22 nm) over a period of 1 minute and the mixture is stirred at 25° C. for 2 hours and at 70° C. for a further 2 hours. The solution is then diluted with 190.0 g of $H_2O$ and the pH is set to 5 by means of 10% strength by weight sulfuric acid. This gives a modified silica sol which displays a slight Tyndall effect.

Example 11

Production of Nafion® Composite Materials and Testing of these 1.25 g of a diluted aqueous $SiO_2$ sol (LUDOX® AS 40 from Grace Davison diluted to 2% by weight of $SiO_2$, set to pH 5 by means of 10% strength by weight sulfuric acid, 22 nm) (dispersion A) or 1.25 g of the modified silica sol from example 8 (dispersion B) are added to 2.50 g of a Nafion® solution (Nafion® from DuPont, perfluorinated ion exchange resin, 20% by weight in a mixture of lower aliphatic alcohols and water). The mixtures are stirred for 10 minutes and subsequently homogenized in an ultrasonic bath for a further 10 minutes.

To produce the test specimens, the dispersions A and B and a sample of an unfilled Nafion® solution (sample C) are poured into a PTFE mold and dried at 80° C. for 120 minutes in an oven. After addition of a few drops of water, the membrane specimens A (from dispersion A), B (from dispersion B) and C (from sample C) can be taken from the PTFE molds.

The membrane specimens produced in this way were cut into test specimens having a width of 10 mm and a length of 60 mm and measured in accordance with EN ISO 527-3 on a Z010 from Zwick to determine their mechanical properties. Each specimen was stretched to rupture at a constant rate of 50 mm per minute. Each measurement was repeated using 3 test specimens and the mean of the measured values was calculated. The properties determined on the respective specimens are listed in table 1.

TABLE 1

Mechanical properties of the composite materials

| | Sample designation | | |
|---|---|---|---|
| | A* | B | C* |
| Tensile strength [MPa] | 7.3 | 12.4 | 11.4 |
| Modulus of elasticity [MPa] | 140 | 306 | 190 |

*not according to the invention

The examples show that the composite material B according to the invention has significantly better mechanical properties than the materials A and C which are not according to the invention.

Example 12

Production of sPEEK Composite Materials and Testing of these 2.0 g of a diluted aqueous $SiO_2$ sol (LUDOX® AS 40 from Grace Davison diluted to 2% by weight $SiO_2$, set to pH 6 by means of 10% by weight sulfuric acid, 22 nm) (dispersion D) or 2.0 g of the modified silica sol from example 8 (dispersion E) or 2.0 g of the modified silica sol from example 9 (dispersion F) or 2.0 g of the modified silica sol from example 10 (dispersion G) are added to 8.0 g of an sPEEK solution (sPEEK from Fumatech, sulfonated polyether ether ketone, 5% strength by weight in DMF). The mixtures are stirred for 10 minutes and subsequently homogenized in an ultrasonic bath for a further 10 minutes.

To produce the test specimens, the dispersions D to G and a sample of an unfilled sPEEK solution (sample H) are poured into a PTFE mold and dried at 100° C. for 5 hours in an oven. After addition of a few drops of water, the membrane specimens D (from dispersion D), E (from dispersion E), F (from dispersion F), G (from dispersion G) and H (from sample H) can be taken from the PTFE molds.

The membrane specimens produced in this way were cut into strips having a length of 3.5 cm and a width of 1.5 cm. Each specimen was boiled in 25% strength by weight sulfuric acid at 70° C. for 2 hours before the actual measurement, subsequently washed 3 times with distilled water and boiled to remove any sulfuric acid still present. To determine the proton-conducting properties, the specimens which had been pretreated in this way were clamped between two platinum electrodes. The proton conductivity was determined at 40° C. and a relative humidity of 100% by means of AC impedance spectroscopy. The properties of the respective specimens determined in this way are listed in table 2.

TABLE 2

Proton-conducting properties of the composite materials at 40° C. and 100% relative humidity

| Sample designation | Proton conductivity [S cm$^{-1}$] |
|---|---|
| D* | 0.031 |
| E | 0.088 |
| F | 0.078 |
| G | 0.082 |
| H* | 0.06 |

*not according to the invention

The examples show that the composite materials E, F and G according to the invention have significantly higher proton conductivities than the materials D and H which are not according to the invention.

Example 13

Production of an Ammoniopropylsulfonate-Functional Pyrogenic Silica 50 g of a solution of 12 g of silane 1 in 38 g of a water/methanol mixture (1:1) and 0.5 g of $NEt_3$ dissolved in 5 ml of MeOH are added to 100 g of hydrophilic SILICA having a moisture content of <1% by weight and an HCl content of <100 ppm and having a specific surface area of 130 m$^2$/g (measured by the BET method in accordance with DIN EN ISO 9277/DIN 66132) (obtainable under the name HDK S13 from Wacker-Chemie GmbH, Munich, Germany) by atomization through a single-fluid nozzle (pressure: 5 bar) at a temperature of 25° C. under inert gas $N_2$. The SILICA which has been laden in this way is fluidized further by means of stirring at a temperature of 25° C. for a residence time of 0.25 hour and is subsequently reacted at 120° C. under $N_2$ in a 100 l drying oven for a residence time of 3 hours. This gives a white SILICA powder having a homogeneous intermediate silylation layer.

The analytical data are shown in table 3.

Example 14

Production of an Ammoniopropylsulfonate-Functional Pyrogenic Silica 700 ml of methanol, 500 ml of deionized water, 12 g of silane 1 and 0.5 g of $NEt_3$ are placed under $N_2$ protective gas in a 2 l three-necked flask. 100 g of hydrophilic SILICA having a moisture content of <1% by weight and an HCl content of <100 ppm and having a specific surface area of 130 $m^2/g$ (measured by the BET method in accordance with DIN EN ISO 9277/DIN 66132) (obtainable under the name HDK S13 from Wacker-Chemie GmbH, Munich, Germany) are subsequently added while stirring. The mixture is refluxed for 2 hours, all volatile constituents are subsequently removed on a rotary evaporator and the white pulverulent residue is heated at 120° C. under $N_2$ in a 100 l drying oven for a residence time of 2 hours.

This gives a white SILICA powder having a homogeneous intermediate silylation layer.

The analytical data are shown in table 3.

TABLE 3

Analytical data for the particles:

|  | % of carbon |
|---|---|
| Example 13 | 3.4 |
| Example 14 | 4.0 |

Description of the Analytical Methods

Carbon Content (% of C)

Elemental analysis for carbon; combustion of the sample in a stream of $O_2$ at >1000° C., detection and quantification of the $CO_2$ formed by means of IR; instrument: LECO 244.

Example 15

Production of an Aqueous Dispersion 4.0 l of deionized (DI) water were placed in a high-performance mixer Unimix LM6 from Ekato having a capacity of 6 l and brought to a pH of 4.5 by means of aqueous 1M HCl. 1000 g of a silica corresponding to example 13 were fed in over a period of 30 minutes while stirring and with the rotor-stator apparatus running, with the pH being maintained at 4.5 by addition of aqueous 1M HCl. The mixture was subsequently intensively sheared for 1 hour, resulting in the temperature rising to about 45° C.

A fluid dispersion was obtained. The analytical data for the dispersion are shown in table 4.

TABLE 4

Analytical data for the dispersion of example 15

| | Solids content (%) | pH | Viscosity (1 h); mPas | Viscosity (28 d; 40° C.); mPas | Average particle size (nm) |
|---|---|---|---|---|---|
| Example 15 | 20.1 | 4.7 | 204 | 225 | 248 |

Description of the Analytical Methods

1. Solids content of the dispersion determined by the following method: 10 g of aqueous dispersion are admixed with the same amount of ethanol in a porcelain dish and evaporated to constant weight at 150° C. in a drying oven flushed with $N_2$. The mass $m_s$ of the dry residue gives the solids content according to solids content/%=$m_s$*100/10 g.
2. pH measured by means of a single-electrode pH measurement apparatus.
3. Average diameter of the sintered aggregates measured by means of photocorrelation spectroscopy using the following method: a sample of the dispersion to be measured having a silica content of 0.3% by weight is prepared by stirring the appropriate amount of starting dispersion into DI water by means of a magnetic stirrer. The samples are measured in the back-scattering mode at 173° using a PCS instrument Zetasizer Nano ZS from Malvern. The average particle diameter is obtained as the number average of the fit of the autocorrelation function.
4. Viscosity of the dispersion determined at 25° C. and a shear rate D=10 $s^{-1}$ by means of an MCR 600 rheometer from Haake having a cone-and-plate sensor system (105 μm measuring gap).

The invention claimed is:

1. A composition of matter comprising solid functionalized particles which contain at least one structural element of the formulae [1] to [3],

and/or a protonated or deprotonated form thereof, wherein the structural elements of the formulae [1] to [3] are covalently bound to the particles by reacting (P) particles having an average primary particle size diameter less than 10 μm with silanes or siloxanes containing a structural element of the formula [1] to [3], and wherein A is a sulfonate radical —$SO_3$, a carboxylate radical —C(O)O or a phosphonate radical —P(O)($OR^7$)O, B is $(CR^1_2)_m$, a substituted or unsubstituted alkyl radical interrupted by heteroatoms, or a substituted or unsubstituted aryl or heteroaryl radical, R and $R^7$ are each hydrogen or a substituted or unsubstituted hydrocarbon radical, $R^1$ is hydrogen, a halogen or a substituted or unsubstituted hydrocarbon radical, and m is 1, 2, 3, 4 or 5, with the proviso that the nitrogen atom in the formula [2] is an endocyclic nitrogen atom of an aliphatic heterocycle, and with the proviso that the nitrogen atom in the formula [3] is an endocyclic nitrogen atom of an aromatic heterocycle.

2. The composition of claim 1, wherein the functionalized particles have a specific surface area of from 0.1 to 1000 m2/g.

3. The composition of claim 1, wherein the structural elements of the formulae [1] to [3] are covalently bound to the functionalized particles (P) through a siloxy linkage.

4. The composition of claim 1, which comprises an aqueous dispersion of functionalized particles having an average particle size, wherein the average particle size measured as mean hydrodynamic equivalent diameter in the form of the number average by photon correlation spectroscopy is less than 1000 nm.

5. The composition of claim 1, which is a toner, developer charge control auxiliary, paper coating or composite material.

6. The composition of claim 1, which is a composite material containing functionalized particles and a matrix material comprising at least one inorganic, organic, inorganic-organic, polar, or ionic material.

7. The composition of claim 1, which is a composite material in the form of an adhesive, sealant, coating, sealing or embedding composition, or a membrane.

8. The composition of claim 1, wherein the particles are reacted with one or more silanes selected from the group consisting of

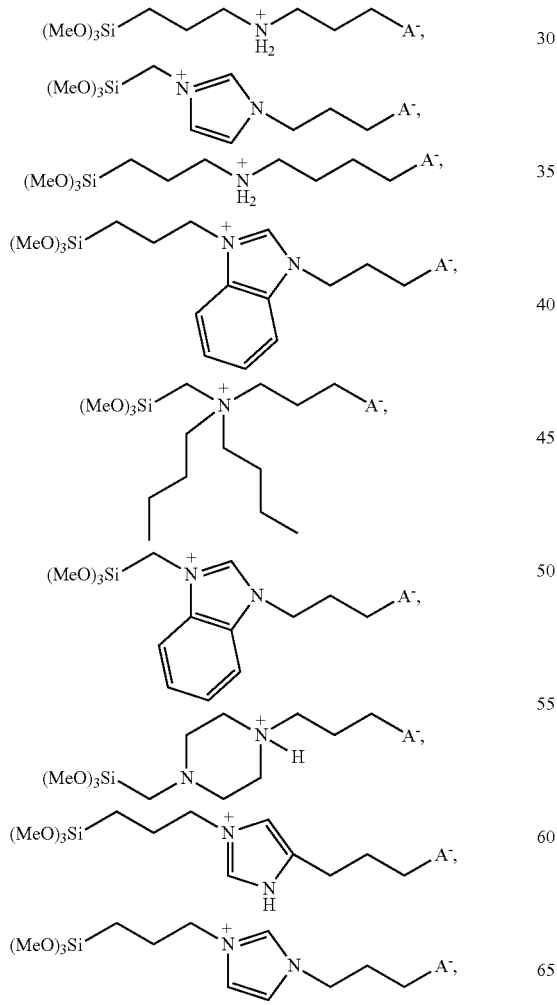

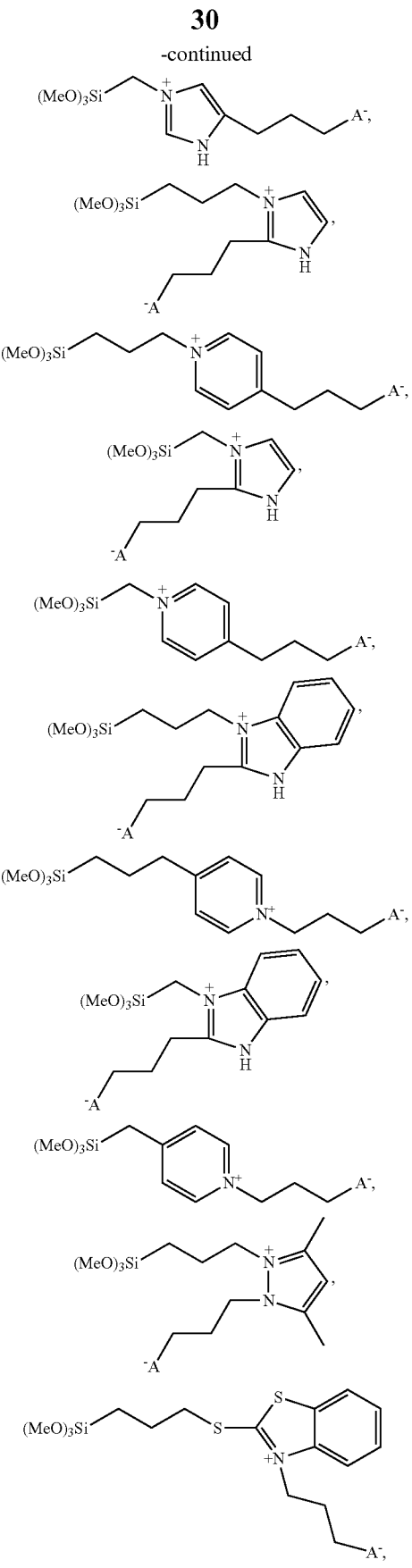

-continued (MeO)₃Si—CH₂—N⁺(pyrazole with methyl groups, N-butyl chain)—A⁻

(MeO)₃Si—CH₂—S—(benzothiazolium)—propyl—A⁻

(MeO)₃Si—propyl—S—(quinolinium)—propyl—A⁻

(MeO)₃Si—propyl—S—(benzoxazolium)—propyl—A⁻

(MeO)₃Si—CH₂—S—(quinolinium)—propyl—A⁻

(MeO)₃Si—CH₂—S—(benzoxazolium)—propyl—A⁻

(MeO)₃Si—propyl—N⁺H₂—ethyl—A⁻

(MeO)₃Si—propyl—N⁺H₂—ethyl—A⁻

(MeO)₃Si—propyl—N⁺H(Me)—ethyl—A⁻  and (MeO)₃Si—propyl—N⁺H(Me)—ethyl—A⁻.

9. The composition of claim 1, further comprising an organic polymer, in which the functionalized particles are dispersed.

10. A process for producing a composition of matter comprising solid functionalized particles which contain at least one structural element of the formulae [1] to [3], $$—NR_2^+—B-A^- \qquad [1],$$

$$=NR^+—B-A^- \qquad [2],$$

$$\equiv N^+—B-A^- \qquad [3],$$

and/or a protonated or deprotonated form thereof, wherein the structural elements of the formulae [1] to [3] are covalently bound to the particles by reacting (P) particles with silanes or siloxanes containing a structural element of the formula [1] to [3], and wherein A is a sulfonate radical —SO₃, a carboxylate radical —C(O)O or a phosphonate radical —P(O)(OR⁷)O, B is $(CR^1_2)_m$, a substituted or unsubstituted alkyl radical interrupted by heteroatoms, or a substituted or unsubstituted aryl or heteroaryl radical, R and R⁷ are each hydrogen or a substituted or unsubstituted hydrocarbon radical, R¹ is hydrogen, a halogen or a substituted or unsubstituted hydrocarbon radical, and m is 1, 2, 3, 4 or 5, with the proviso that the nitrogen atom in the formula [2] is an endocyclic nitrogen atom of an aliphatic heterocycle, and with the proviso that the nitrogen atom in the formula [3] is an endocyclic nitrogen atom of an aromatic heterocycle, the process comprising reacting functionalizable particles with at least one silane or siloxane having at least one structural element of the formulae [1] to [3] to form functionalized particles.

11. The process of claim 10, wherein organopolysiloxanes of the formula [4], $$[R^3{}_3SiO_{1/2}]_i[R^3{}_2SiO_{2/2}]_j[R^3SiO_{3/2}]_k[SiO_{4/2}]_l \qquad [4]$$

where

R³ is an OH function, an unsubstituted or halogen-, hydroxyl-, amino-, epoxy-, phosphonato-, thiol-, (meth)acryl-, carbamate- or NCO-substituted $C_{1-18}$ hydrocarbon radical wherein adjacent carbon atoms may be interrupted by nonadjacent oxygen, sulfur or NR³' groups, R³' has the meaning of R¹, and j, k, l are each greater than or equal to 0, with the proviso that i+j+k+l is greater than or equal to 3, and that at least 1 radical R³ is an OH function, are used as functionalizable particles (P).

12. The process of claim 10, wherein pyrogenic silica is used as functionalizable particles (P).

13. The process of claim 10, wherein silica sol is used as functionalizable particles (P).

14. The process of claim 10, wherein the step of reacting is performed by first spraying the silane or siloxane onto dry particles while agitating the particles, and agitating the pulverulent mixture thereby obtained and reacting at a temperature of from 40° C. to 200° C.

15. The process of claim 10, wherein the step of reacting is performed by first spraying the silane or siloxane onto dry particles while agitating the particles, and agitating the pulverulent mixture thereby obtained and reacting at a temperature of from 80° C. to 150° C.

16. A composition of matter comprising solid functionalized particles which contain at least one structural element of the formulae [1] to $$—NR_2^+—B-A^- \qquad [1],$$

$$=NR^+—B-A^- \qquad [2],$$

$$\equiv N^+—B-A^- \qquad [3],$$

and/or a protonated or deprotonated form thereof, wherein the structural elements of the formulae [1] to [3] are covalently bound to the particles by reacting (P) particles with silanes or siloxanes containing a structural element of the formula [1] to [3], and wherein A is a sulfonate radical —SO₃, a carboxylate radical —C(O)O or a rhos shonate radical —P(O)(OR⁷)O, B is $(CR^1{}_2)_m$ a substituted or unsubstituted alkyl radical interrupted by heteroatoms or a substituted or unsubstituted aryl or heteroaryl radical, R and $R^7$ are each hydrogen or a substituted or unsubstituted hydrocarbon radical, $R^1$ is hydrogen, a halogen or a substituted or unsubstituted hydrocarbon radical, and m is 1, 2, 3, 4 or 5, with the proviso that the nitrogen atom in the formula [2] is an endocyclic nitrogen atom of an aliphatic heterocycle, and with the proviso that the nitrogen atom in the formula [3] is an endocyclic nitrogen atom of an aromatic heterocycle further comprising a polymer matrix material in which the functionalized particles are dispersed, said composition in the form of a fuel cell membrane.

17. In a fuel cell comprising at least one fuel cell membrane, the improvement comprising including in said fuel cell at least one fuel cell membrane of claim 16.

18. A composition of matter comprising solid functionalized particles which contain at least one structural element of the formulae [1] to [3],

—NR$_2{}^+$—B-A$^-$     [1],

=NR$^+$—B-A$^-$     [2],

≡N$^+$—B-A$^-$     [3], and/or a protonated or deprotonated form thereof, wherein the functionalized particles are prepared by reacting particles (P) comprising primary particles with an average diameter less than 10 μm with silanes or siloxanes containing a structural element of the formula [1] to [3] and at least one silyl group which is reactive with surface functions of the particles (P), and wherein A is a sulfonate radical —SO$_3$, a carboxylate radical —C(O)O or a phosphonate radical —P(O)(OR$^7$)O, B is $(CR^1{}_2)_m$, a substituted or unsubstituted alkyl radical interrupted by heteroatoms, or a substituted or unsubstituted aryl or heteroaryl radical, R and $R^7$ are each hydrogen or a substituted or unsubstituted hydrocarbon radical, $R^1$ is hydrogen, a halogen or a substituted or unsubstituted hydrocarbon radical, and m is 1, 2, 3, 4 or 5, with the proviso that the nitrogen atom in the formula [2] is an endocyclic nitrogen atom of an aliphatic heterocycle, and with the proviso that the nitrogen atom in the formula [3] is an endocyclic nitrogen atom of an aromatic heterocycle, and wherein the structural elements of the formulae [1] to [3] are bound covalently to the solid particles through the silyl group.

19. The composition of claim 18, wherein said reactive silyl group has the formula ≡Si—Y wherein Y is halogen, hydroxyl, alkoxy, carboxylate, or enolate.

20. The composition of claim 19, wherein Y is halogen or alkoxy.

21. The composition of claim 19, wherein Y is methoxy or ethoxy.

22. The composition of claim 18, wherein the silanes or siloxanes comprise at least one silane or siloxane selected from the group consisting of a) organosilicon compounds of the formula:

(R$^4$O)$_{3-a}$R$^4{}_a$Si—(CH$_2$)$_n$—NR$_2{}^+$—(CH$_2$)$_m$-A$^-$     [5]

where a is 0, 1 or 2 and n is 1, 2 or 3, $R^4$ has one of the meanings of $R^1$ and R;

b) organosilicon compounds of the formula:

(R$^4$O)$_{3-a}$R$^4{}_a$Si—(CH$_2$)$_n$—K$^+$(CH$_2$)$_m$-A$^-$     [6]

where

K is a substituted or unsubstituted aryl or heteroaryl radical which has at least one tetravalent nitrogen =N—, and c) organosilicon compounds of the formula:

[R$^5{}_3$SiO$_{1/2}$]$_w$[R$^5{}_2$SiO$_{2/2}$]$_x$[R$^5$SiO$_{3/2}$]$_y$[SiO$_{4/2}$]$_z$     [7]

where $R^5$ is hydrogen or a substituted or unsubstituted hydrocarbon radical and has at least one halogen, an OH group or an alkoxy group and at least one structural element of the general formulae [1] to [3] and w, x, y, z are each greater than or equal to 0, with the proviso that w+x+y+z is greater than or equal to 3, and that at least 1 radical $R^5$ is an OH function.

* * * * *

UNITED STATES PATENT AND TRADEMARK OFFICE
CERTIFICATE OF CORRECTION

PATENT NO. : 8,137,590 B2
APPLICATION NO. : 12/091082
DATED : March 20, 2012
INVENTOR(S) : Christoph Briehn et al.

Page 1 of 1

It is certified that error appears in the above-identified patent and that said Letters Patent is hereby corrected as shown below:

Column 32, Line 53, Claim 16:

After "structural element of the formulae [1] to"
Insert --[3]--.

Column 32, Line 67, Claim 16:

After "a carboxylate radical –C(O)O or a"
Delete "hros shonate radical" and
Insert --phosphate radical--.

Signed and Sealed this
Twenty-sixth Day of June, 2012

David J. Kappos
*Director of the United States Patent and Trademark Office*